R. TOEPLITZ.
JOURNAL BOX LUBRICANT DEVICE.
APPLICATION FILED NOV. 19, 1915.
1,184,050.
Patented May 23, 1916.
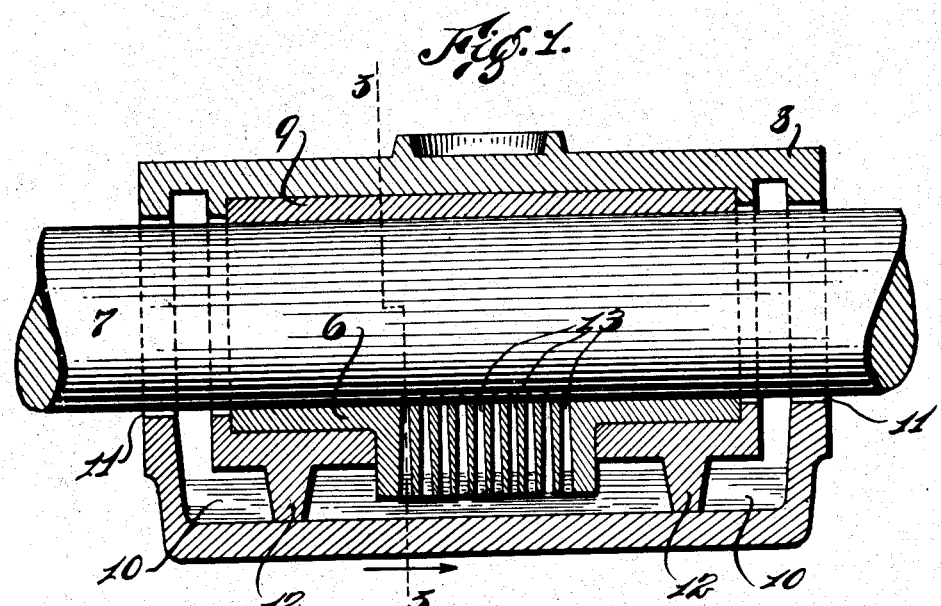
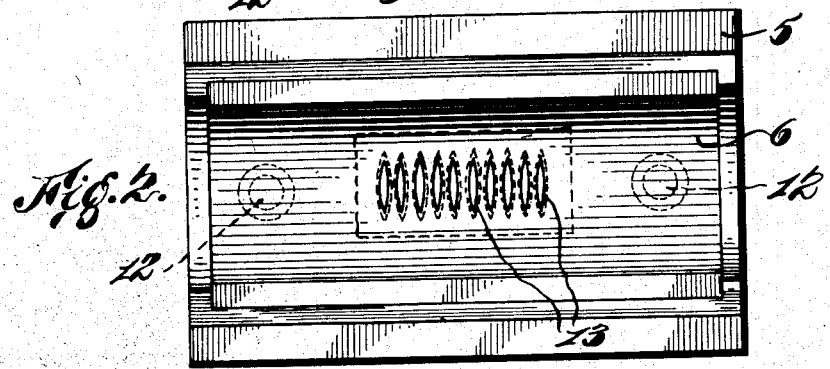
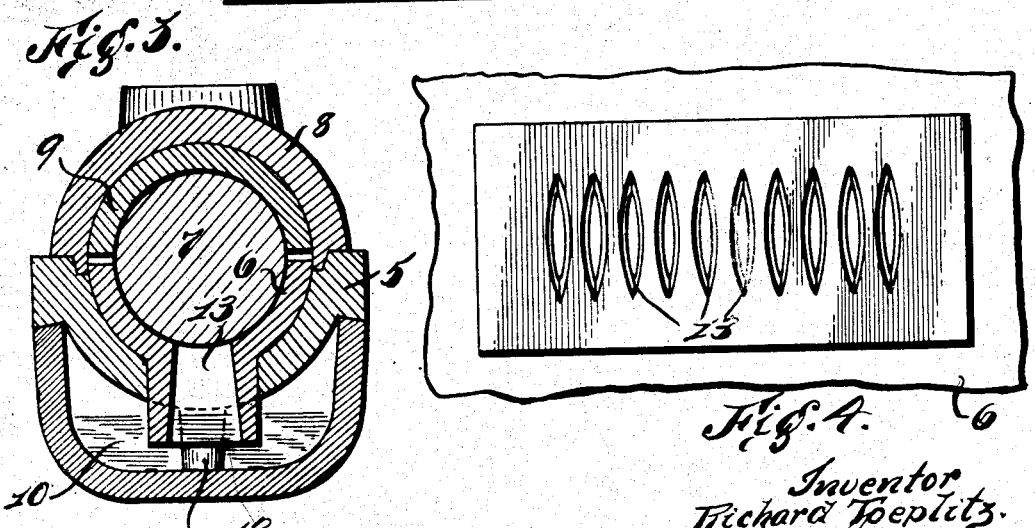
Inventor
Richard Toeplitz.
by Philip B. Keck
attorney.

UNITED STATES PATENT OFFICE.

RICHARD TOEPLITZ, OF ELIZABETH, NEW JERSEY, ASSIGNOR TO THE A. & F. BROWN COMPANY, OF ELIZABETH, NEW JERSEY, A CORPORATION OF NEW JERSEY.

JOURNAL-BOX LUBRICANT DEVICE.

1,184,050.   Specification of Letters Patent.   Patented May 23, 1916.

Application filed November 19, 1915. Serial No. 62,304.

*To all whom it may concern:*

Be it known that I, RICHARD TOEPLITZ, a citizen of the United States, and a resident of Elizabeth, in the county of Union and State of New Jersey, have invented certain new and useful Improvements in Journal-Box Lubricant Devices, of which the following is a specification.

My invention relates to that class of lubricant devices for journals in which the journal-box is provided in its bottom with an oil chamber from which the oil or other lubricating liquid is carried upward to the journal.

The objects of my invention, among other things, are to simplify and improve the construction of the lubricating surface of the bearing so as to increase the power of resistance in the bearing, and further to prevent any dirt or foreign material in the oil chamber from passing up to the journal from the surface of the oil, and further to enable the oil or lubricant to be readily fed to the journal so that the bearing is continuously supplied with sufficient oil during the revolutions of the journal. My improved construction also enables the shaft to be easily pushed into the bearing without injuring or destroying the lubricating device proper, which is likely to occur in certain forms of lubricating devices where the lubricating block is spring-pressed against the shaft separate from the bearing plate.

In the accompanying drawings, Figure 1 is a longitudinal sectional elevation of a journal-box showing my improvement. Fig. 2 is a plan view of the lower bearing shown in Fig. 1. Fig. 3 is a cross sectional view taken on the line 3—3 of Fig. 1, looking in the direction of the arrow. Fig. 4 is an enlarged plan view of a portion of the bearing shown in Fig. 2.

Similar numerals refer to similar parts throughout the several figures.

In the drawings, 5 represents the journal-box having a bearing plate 6 supporting the journal 7. The journal-box 5 is provided with a cap 8 having an upper bearing plate 9. Below the journal-box 5 is a suitably formed oil chamber 10 into which oil or other lubricating liquid may be poured through suitable openings 11 located at the ends of the journal-box 5, as shown in Fig. 1. The journal-box 5 may have the standards 12 resting on the bottom of the oil chamber as shown.

Referring more particularly to Figs. 2 and 4, 13 represents a series of narrow, transverse slots cut in the bearing plate 6, preferably convex in cross-section, and having very pointed or acute-angled corners at either end to insure efficient capillary attraction, as shown, and extending downwardly into the oil chamber 10 below the surface of the oil, as shown in Figs. 1 and 3. This lubricating block portion with the narrow, transverse slots 13 is preferably cast of the same metal with the journal-box 5 or with the bearing plate 6, and the slots 13 taper upwardly from the oil chamber 10 as shown in the figures.

It is obvious that the lubricating device is closed on all four sides having only openings at the top and bottom, the bottom openings being of larger area than those at the top of the lower bearing plate 6 contiguous to the journal 7. These openings are small enough to lift the oil from the chamber 10 to the bearing through capillary attraction so as to lubricate the journal 7. In operation, the revolutions of the journal 7, in the bearing 6, over the slots 13, tends to produce a vacuum in these slots which, combined with capillary attraction, draws the oil freely through the slots to the bearing surface, and further the amount of lubricating of the journal is thereby increased in proportion to the requirements of use.

It is obvious that my improved lubricating device has great inherent strength, durability and efficiency, as well as simplicity of construction, and while I realize that considerable variation may be made in detailed structural features, I do not wish to be understood as limiting my invention to the specific forms herein illustrated.

Having now described my invention, what I claim as new and desire to secure by Letters Patent is the following, viz:

1. The combination with a journal-box having an oil-chamber below same, of a bearing plate having formed therein a lubricating block consisting of a series of transverse slots, the walls of which form acute angles at the ends, extending downwardly into the oil-chamber and closed on all four sides.

2. The combination with a journal-box having an oil-chamber below same, of a bearing plate having formed therein a lubricating block consisting of a series of transverse slots, the walls of which form acute angles at the ends, convex in cross section, extending downwardly into the oil-chamber and closed on all four sides.

3. The combination with a journal-box having an oil-chamber below same, of a bearing plate having formed therein a lubricating block consisting of a series of transverse slots, the walls of which form acute angles at the ends, tapering toward the top, and extending downwardly into the oil-chamber and closed on all four sides.

4. The combination with a journal-box having an oil-chamber below same, of a bearing plate having formed therein a lubricating block consisting of a series of transverse slots, the walls of which form acute angles at the ends, convex in cross section and tapering toward the top, and extending downwardly into the oil-chamber and closed on all four sides.

5. The combination with a journal-box having an oil-chamber below same, of a bearing plate having formed therein a lubricating block consisting of a series of transverse, capillary slots, the walls of which form acute angles at the ends, extending downwardly into the oil-chamber and closed on all four sides.

6. The combination with a journal-box having an oil-chamber below same, of a bearing plate having formed therein a lubricating block consisting of a series of transverse, capillary slots, the walls of which form acute angles at the ends, convex in cross section, extending downwardly into the oil-chamber and closed on all four sides.

7. The combination with a journal-box having an oil-chamber below same, of a bearing plate having formed therein a lubricating block consisting of a series of transverse, capillary slots, the walls of which form acute angles at the ends, tapering toward the top, and extending downwardly into the oil-chamber and closed on all four sides.

8. The combination with a journal-box having an oil-chamber below same, of a bearing plate having formed therein a lubricating block consisting of a series of transverse, capillary slots, the walls of which form acute angles at the ends, convex in cross section and tapering toward the top, and extending downwardly into the oil-chamber and closed on all four sides.

9. The combination with a journal-box having an oil-chamber below same, of a bearing plate having integrally formed therein a lubricating block consisting of a series of transverse slots, the walls of which form acute angles at the ends, extending downwardly into the oil-chamber and closed on all four sides.

10. The combination with a journal-box having an oil-chamber below same, of a bearing plate having integrally formed therein a lubricating block consisting of a series of transverse slots, the walls of which form acute angles at the ends, convex in cross section, extending downwardly into the oil-chamber and closed on all four sides.

11. The combination with a journal-box having an oil-chamber below same, of a bearing plate having integrally formed therein a lubricating block consisting of a series of transverse slots, the walls of which form acute angles at the ends, tapering toward the top, and extending downwardly into the oil-chamber and closed on all four sides.

12. The combination with a journal-box having an oil-chamber below same, of a bearing plate having integrally formed therein a lubricating block consisting of a series of transverse slots, the walls of which form acute angles at the ends, convex in cross section and tapering toward the top, and extending downwardly into the oil-chamber and closed on all four sides.

13. The combination with a journal-box having an oil-chamber below same, of a bearing plate having integrally formed therein a lubricating block consisting of a series of transverse, capillary slots, the walls of which form acute angles at the ends, extending downwardly into the oil-chamber and closed on all four sides.

14. The combination with a journal-box having an oil-chamber below same, of a bearing plate having integrally formed therein a lubricating block consisting of a series of transverse, capillary slots, the walls of which form acute angles at the ends, convex in cross section, extending downwardly into the oil-chamber and closed on all four sides.

15. The combination with a journal-box having an oil-chamber below same, of a bearing plate having integrally formed therein a lubricating block consisting of a series of transverse, capillary slots, the walls of which form acute angles at the ends, tapering toward the top, and extending downwardly into the oil-chamber and closed on all four sides.

16. The combination with a journal-box having an oil-chamber below same, of a bearing plate having integrally formed therein a lubricating block consisting of a series of transverse, capillary slots, the walls of which form acute angles at the ends, convex in cross section and tapering toward the top, and extending downwardly into the oil-chamber and closed on all four sides.

17. A lubricating block formed with a series of transverse slots, the walls of which form acute angles at the ends, convex in cross section, and closed on all four sides.

18. A lubricating block formed with a series of transverse slots, the walls of which form acute angles at the ends, tapering toward the top, and closed on all four sides.

19. A lubricating block formed with a series of transverse slots, the walls of which form acute angles at the ends, convex in cross section and tapering toward the top, while closed on all four sides.

20. A lubricating block formed with a series of transverse slots, the walls of which form acute angles at the ends, and closed on all four sides.

RICHARD TOEPLITZ.

Witnesses:
 CHARLES BROWN,
 JOHN R. SAUERBRUNN.